Oct. 14, 1969   J. M. GERRARD   3,472,923
PROCESS FOR MANUFACTURING PLASTIC TUBING AT HIGH OUTPUT RATES
Filed Sept. 15, 1966                                    2 Sheets-Sheet 1

INVENTOR

J. M. Gerrard

W. G. Hopley, Agent

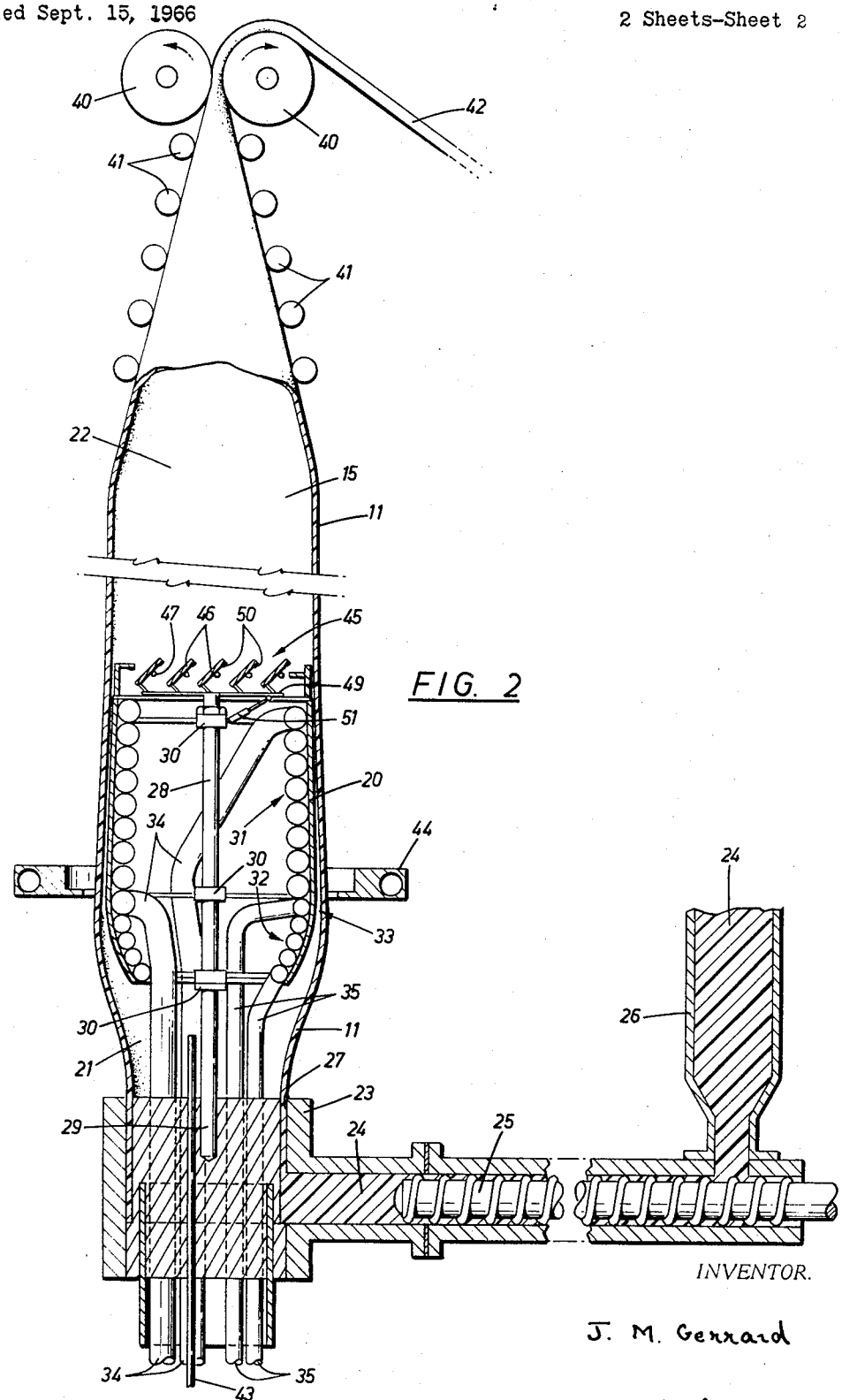

United States Patent Office 3,472,923
Patented Oct. 14, 1969

3,472,923
PROCESS FOR MANUFACTURING PLASTIC
TUBING AT HIGH OUTPUT RATES
John Mason Gerrard, Downsview, Ontario, Canada, assignor to Union Carbide Canada Limited, Toronto, Ontario, Canada, a company of Canada
Filed Sept. 15, 1966, Ser. No. 580,849
Int. Cl. B29d 17/07, 17/00
U.S. Cl. 264—95                                4 Claims

ABSTRACT OF THE DISCLOSURE

An apparatus and method for producing flattened tubing by extruding thermoplastic material from a die upwardly over and beyond an open core cooling mandrel and collapsing the tubing at a point beyond the mandrel while maintaining a gaseous bubble in the tubing between the die and the collapsing point so that a portion of the bubble is located both upstream and downstream of the mandrel. The open core in the mandrel provides a passage for volatile substances in the interior of the bubble upstream of the mandrel to pass downstream of the mandrel. The core of the mandrel has a mean cross-sectional area of not less than about 25% of the maximum cross-sectional area of the tube in the region of the cooling mandrel and has a minimum cross-sectional area of not less than 10% of the maximum cross-sectional area of the tube in the region of the cooling mandrel.

---

This invention relates generally to extruded tubing, and has to do particularly with a method extruding thin-walled continuous seamless tubing of thermoplastic organic material.

As will be described below in more detail with reference to the drawings, one of the early developments in the field of extruded seamless tubing is generally referred to as the "air bubble method," and is exemplified in Canadian Patent No. 460,963, issued Nov. 8, 1949, to E. D. Fuller. The air bubble method consisted essentially of upwardly extruding a continuous tube of thermoplastic material in the hot, plastic state from an annular orifice, flattening and drawing the tube upwardly between flattening rollers spaced above the orifice, maintaining an isolated air bubble within the tube between the orifice and the rollers to support the walls of the tube, and directing cooling air against the exterior of the tube to set or "freeze" it at an intermediate point between the orifice and the rollers. Convection currents within the air bubble permitted volatile substances boiling off the extruded thermoplastic material to condense out on the cooler, upper walls of the tube, from where they became entrained between the flattened sides of the tube between the rollers and acted as slip agents. In the remainder of this specification the terms "upstream" and "downstream" will be used to describe the portions of the air bubble remote from and adjacent to, respectively, the extrusion orifice, regardless of whether the tubing is being extruded upwardly or downwardly.

In an attempt to improve the control of the dimensions of the extruded tube, and in order to bring about an increase in the cooling rate so that higher extrusion rates could be used and so that the physical properties of the tubing would improve, a further development in the prior art was made involving positioning a cylindrical cooling mandrel within the extruded tubing midway between the orifice and the flattening rollers. However, the mandrel of course divided the "air bubble" of Fuller into two separate compartments and effectively cut off convection currents within it, so that volatile substances in the upstream compartment could not pass to the downstream compartment for condensation. Other problems also arose, related to balancing the pressures in the upstream and downstream compartments, and to the collection of condensate on the cooling mandrel, and these will be described more fully below with reference to the drawings.

One object of this invention is to provide a method extruding seamless tubing which combine the desirable convection characteristics of the Fuller patent, which permit volatile substances to condense on the downstream cooler walls of the tubing, with the advantages attendant upon the use of an interior cooling mandrel.

This and other objects and advantages will appear from the following description taken in conjunction with the accompanying drawings, in which like numbers refer to like parts throughout the several views and in which:

FIGURE 2 is an elevational view of an embodiment of this invention; and

Figure 1:
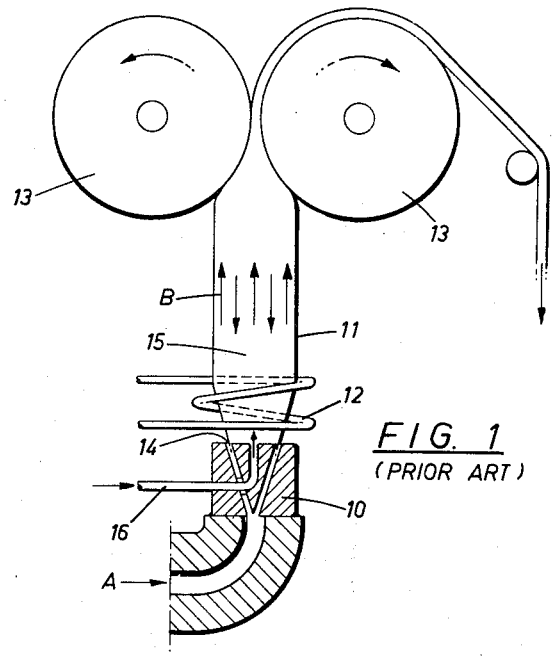
FIGURE 1 is an elevational view of a prior art device.
Figure 3:
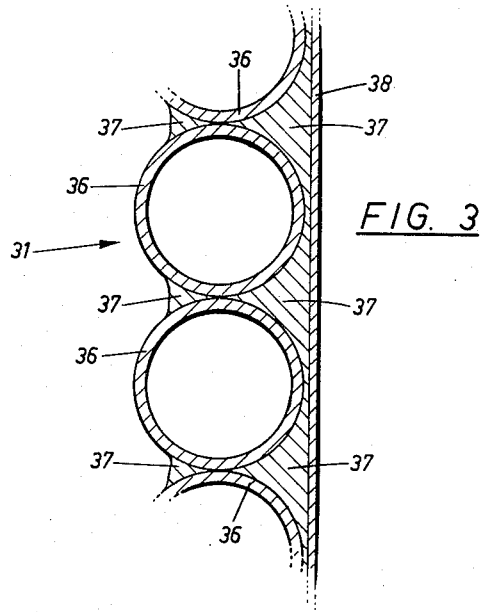

FIGURE 3, on the same drawing sheet as FIGURE 1, is an enlarged view of a portion of the apparatus shown in FIGURE 2.

In FIGURE 1 is shown the essential arrangement of the prior art apparatus exemplified by the Fuller Canadian Patent No. 460,963 referred to above, and generally known as the "air bubble method." As can be seen, the Fuller arrangement consists of an extrusion die 10 from which tubing 11 is extruded upwardly past a helical air knife 12 and between two large rollers 13 which flatten the tubing 11 and draw it upwardly. Thermoplastic material in the hot, plastic state is fed in at A, from where it is distributed to the annular die opening 14. The helical air knife 12 surrounds the tubing 11 at an intermediate location between the die 10 and the flattening rollers 13. The purpose of the air knife 12 is to direct cooling air against the exterior surface of the thermoplastic tube 11 so as to cool and set the latter. The final circumferential size of the tubing is controlled by adjusting the amount of air or gaseous material within the tubing 11. Air is admitted or exhausted from the "air bubble" 15 by means of a tube 16, which is only employed when it is desired to change or adjust the size of the air bubble. It will be appreciated that, once the air bubble 15 has been established within the tubing, it is then isolated or "captive," and the amount of air within it will not change appreciably. In this prior art arrangement, the isolated air bubble 15 within the tubing is sufficient to cause the latter to expand as it passes upwardly until it reaches the neighbourhood of the air knife where it is "frozen" or set.

The natural convection currents within Fuller's air bubble 15, although these would naturally change somewhat from installation to installation, are believed to have an essentially radially symmetrical configuration somewhat as follows: the central core or column of the air bubble is heated by the hot die and rises; the part of the air bubble directly adjacent the extruded tubing is heated by the latter and rises as well; a downdraft takes place somewhere intermediate these two rising portions of the air bubble. The direction of these currents is shown generally by arrows B in FIGURE 1.

In tubing extrusion processes of the kind we are here dealing with, certain volatile substances, trace elements and impurities tend to boil off the thermoplastic material immediately upon extrusion. For example, thermoplastic material often contains traces of the solvent used in the polymerization process and low molecular weight fractions. In the Fuller air bubble arrangement, these volatile substances become entrained in the convection currents within the air bubble and are transported to the upper, frozen walls (downstream walls) of the tube adjacent the flattening rollers 13, and there condense. Usually, an equilibrium can be set up between the rate of volatilization and the rate of condensation so that the amount of volatile substance within the air bubble remains substantially constant, the volume of the air bubble thus remaining constant as well. The condensate on the downstream portions of the tubing 11 is carried away between the flattening rollers 13.

The precise air bubble convection configuration described above is not believed to be essential to the establishment of an equilibrium situation as regards condensate within the air bubble. What is essential, however, is that there be sufficient convection throughout the length of the air bubble for the volatile substances to be carried from one end to the other.

Although Fuller encounters no problems with regard to volatile substances, his arrangement does have the disadvantage that the cooling or setting of the thermoplastic, which is intimately related to establishing the final diameter and thickness of the tube, is somewhat difficult to control, as mentioned above.

Partly as an attempt to overcome this difficulty of control, and also to increase the cooling rate in order to improve the physical characteristics of the tubing, and increase the cooling rate, some development has been carried out in the direction of providing cooling mandrels within the tubing at an intermediate location between the die and the flattening rollers. The following patents are exemplary of this development:

Dyer, U.S. 2,966,700, Jan. 3, 1961; Gerow, U.S. 2,720,680, Oct. 18, 1955; Gerow, U.S. 3,061,875, Nov. 6, 1962; Gerow, U.S. 3,084,386, Apr. 9, 1963; Kritchever, Canadian 669,500, Aug. 27, 1963.

The principal drawback of the above patents is related to the fact that, either by accident or by design, the cooling mandrel prevents the free passage of convection currents between the upstream and the downstream zones, and therefore eliminates the possibility of the upstream condensation of downstream volatile substances. This disadvantage will be clear from FIGURE 2 of the drawings, if it is imagined that the mandrel 20 shown in FIGURE 2 is solid, so as to provide a barrier between the upstream and downstream portions of the air bubble 15. With the solid mandrel arrangement, although there is no direct and easy communication between the upstream and downstream compartments of the air bubble, there is a gradual leakage of air from the upstream compartment 21 to the downstream compartment 22 around the surface of the mandrel 20 itself. This gradual leakage is inevitable because the upward movement of the tubing 11 entrains with it some of the air from the upstream compartment 21 and slowly delivers it to the downstream compartment 22. The effect of this is that the downstream compartment 22 gradually expands and increases in pressure, while the upstream compartment 21 gradually shrinks and decreases in pressure. The gradual shrinkage of the upstream compartment 21 has the effect of drawing the film in around the mandrel 20, and the increased contact pressure between the two sometimes leads to irregularities and rupture. It is also observed that the increasing imbalance between the pressures in the compartments 21 and 22 is sometimes equalized very suddenly by a travelling bubble which descends along the mandrel surface from the downstream compartment 22 to the upstream compartment 21 of the air bubble 15. The strains to which the tubing is thereby subjected, however, almost always lead to rupture of the tubing.

One attempt to cure the progressive imbalance of pressures in the two compartments was the installation of a feed tube to the upstream compartment 21 and a bleed tube to the downstream compartment 22, each equipped with a needle valve, for the equalization of the pressures. However, the apparatus involved in this equalization was cumbersome and difficult to control.

A more serious disadvantage of the solid mandrel arrangement is that convection currents are completely blocked off. This means in effect that volatiles can no longer condense out on the upper, cooler (downstream) portion of the tubing, but rather collect on the cooler mandrel as a sticky glue-like substance that can cause streaking and irregularities in the tubing wall and often leads to rupture of the tube itself, especially when the latter is very thin. It has been found that the difficulty is somewhat alleviated by the provision of an air knife around the outside of the tube at the location of the mandrel, although this partial solution is not entirely satisfactory. It is thought that the limited beneficial effect that the air knife does have is due to the setting up of a high frequency vibration in the film as it passes the mandrel, which allows the film to pick up the condensate continuously in minute quantities and carry it across the mandrel.

Another problem related to condensate is that the latter often tends to collect at the bottom of the mandrel from where it drips off onto the hot die, there flashing back into the vapour phase. This is of course highly undesirable, as it produces violent changes in the volume of the air contained in the upstream portion of the air bubble.

This further problem has been partially overcome by the provision of drip cups on the underside of the mandrel to catch the condensate as it drips off.

With respect to the above cited prior art, all of the Gerow patents show a solid water-cooled mandrel interposed within the tube between the die and the flattening roller. The extruded tubing fits snugly around the cooling mandrel in such a way that the "air bubble" within Gerow's tubing is divided into two discrete compartments, one upstream of, the other downstream of, the cooling mandrel. Other than the small ineffective leakage of air around the mandrel surface as previously described, there is no communication whatever between the upstream and downstream portions of Gerow's air bubble, and consequently convection or condensation cannot take place of the kind operating within Fuller's air bubble.

In those embodiments of the Dyer patent where a cooling mandrel is employed, a system of forced air movement between the two zones is set up in such a way as to force air from the upstream portion of the air bubble, and presumably any entrained volatile substances, out around the periphery of the cooling mandrel between the latter and the tubing walls and up into the downwstream portion of the air bubble. Dyer thus in fact forces the volatile-laden air against the inner surface of the tubing and past the cold surfaces of the mandrel, thereby producing the same kind of disadvantageous solid-mandrel system as described above with reference to FIGURE 2.

The Kritchever patent does show free communication between the two compartments separated by his mandrel, but only by a length of piping of which the diameter is small compared to the tubing diameter. The opening thereby produced would be sufficient to equalize the two pressures, and thereby to eliminate the problem of the progressive pressure imbalance as between the upstream and downstream compartments. However, since the pipe has been included merely to compensate for the gradual entrainment of air around the outer surface of the mandrel from the upstream to the downstream zone, it is clear that the movement of air in the pipe will be one way only, that is, upwardly from the downstream to the upstream zone. This means that the volatile-laden upstream air can pass to the downstream compartment only around the cold periphery of the mandrel, which is highly undesirable as pointed out above. It is furthermore doubtful that Kritchever could have contemplated the problem of volatile substances, since his preferred embodiment appears to be one where the tubing is extruded downwardly rather than upwardly.

This invention consists essentially in the provision of an open-core mandrel within the extruded tube, the open core being of sufficient size to permit natural convection currents within the gaseous bubble to pass across the mandrel between the upstream and downstream portions so that volatile substances boiling off the extruded thermoplastic material in the upstream portion can be transferred to the downstream portion where said substances can condense on the frozen downstream walls of the tubing. With such an arrangement, the Fuller convection system is combined with the advantages attendant upon the use of interior cooling mandrels.

More specifically, this invention provides, in a method of producing flattened tubing, the steps of continuously extruding generally upwardly a seamless tube of thermoplastic material in the heated, plastic state, continously drawing the tube over and beyond an open-core cooling mandrel with a roughened surface of which the circumference substantially corresponds to the desired final circumference of the tubing thereby contacting the theremoplastic material with said roughened surface, circulating a cooling medium through the mandrel in order that the tube can be frozen at the desired circumferential size as it passes the mandrel, drawing the tube towards, and collapsing it at, a point beyond the mandrel, maintaining within the tube between the point of extrusion and the point of callapsing an isolated gaseous bubble having a portion upstream and a portion downstream of the mandrel, and maintaining within the gaseous bubble, by virtue of the open core of the cooling mandrel, natural convection currents passing through the mandrel between said portions so that volatile substances boiling off the extruded thermoplastic material in the upstream portion can be transferred through the open core to the downstream portion where said substances can condense on the frozen downstream walls of the tube.

The invention will now be described with reference to FIGURES 2 and 3. In FIGURE 2 is shown a die 23, to which thermoplastic material 24 in the hot, plastic state is impelled by means of the usual screw propeller 25. A supply vessel 26 feeds thermoplastic material to the screw propeller 25. The die 23 has an annular opening or orifice 27 from which the thermoplastic material 24 is extruded in a continuous, seamless tube 11. A threaded rod 28 is screwed into a tapped bore 29 in the die 23, and carries three spiders 30 which support the mandrel shell now to be described.

Basically, the mandrel shell as shown consists of two, separate, copper-pipe helicoids, the copper pipe for each one being of a different diameter. The upper helicoid 31 is made up of approximately eight convolutions of large diameter copper pipe, while the lower helicoid 32 is made up of approximately four convolutions of small diameter copper pipe. The upper helicoid 31 has a slight, upward conical taper away from the shoulder 33 of the mandrel 20, the shoulder 33 being the approximate junction the shoulder 33. A cooling medium, such as cold water helicoid 32 has a downward, convex taper away from the shoulder 33. A cooilng medium, such as cold water or a Freon, is conducted to and from the upper and lower helicoids by feed pipes 34 and 35, respectively. The feed pipes 34 and 35 pass upwardly through the die 23 and into the interior of the mandrel 20, from which they branch to their respective helicoid ends.

FIGURE 3 shows in greater detail the actual structure of the shell. This sectional view shows several convolutions of the upper helicoid 31. The individual convolutions 36 of copper pipe are welded together by means of metallized copper 37 applied to fill in the valleys on both sides between the tube convolutions 36. The metallized copper is machined to the approximate dimensions of the final product, and then electroplated with .010–.020" copper to fill in the pores of the sprayed metallized copper, and finally electroplated with hard chrome .005" thick polished and finally sandblasted with aluminum oxide to give a matte finish (25–30 microinches). In FIGURE 3, the exaggerated layer 38 is intended to represent both the electroplated copper and the electroplated hard chrome. The sandblasted chrome provides a roughened surface on the mandrel. Flattening means are located beyond the cooling mandrel 20 in the direction of tube travel for drawing the tube 11 past the cooling mandrel 20 and flattening it. The flattening means consists of two principal nip rollers 40, between which the tube 11 is flattened, and a series of lead-in rollers 41 which gradually flatten the tubing 11 so that it can be nipped between the nip rollers 40. after passing through the nip of the rollers 40, the flattened tubing 11 is led off at 42 to be wound upon a storage drum of the usual kind. An isolated, gaseous bubble is maintained within the interior of tube 11 between the die 23 and the flattening rollers 40 in order to support the tubing walls against inward collapse. The gaseous medium for the bubble is introduced into the interior of the tubing 11 by means of a feed pipe 43 which passes upwardly through the centre of the die 23 as shown.

It will be appreciated from the above description that the cooling mandrel 20 has an open core which is only slightly obstructed by the presence of the cooling medium pipes 34 and 35, and the rod 28. It is important that the open core of the mandrel be of sufficient size to permit natural convection currents within the gaseous bubble 15 to pass across the mandrel 20 between the upstream compartment 21 and the downstream compartment 22 so that volatile substances boiling off the extruded thermoplastic material in the upstream portion (upon emergence from the annular opening 27) can be transferred to the downstream compartment where these substances can condense on the frozen downstream walls of the tubing 11.

It is difficult to establish exact values for the minimum mandrel opening below which convection does not take place. It will be understood that the situation is one of degree, and that there is no opening diameter at which convection currents abruptly cease. Furthermore, the size of the opening will to some extent depend upon the composition of the thermoplastic being extruded. For example, the higher the concentration of volatile components (slip agents, low molecular weight fractions, solvent traces), the larger the opening required for best results. Also, with a given thermoplastic, the temperature of the thermoplastic will affect the amount of volatiles evolved and hence the size of the mandrel opening.

It is believed that the convection characteristics are affected both by the minimum area of the mandrel opening and by the mean area thereof, and consequently the size of the opening will be defined with reference to both values in the appended claims. Assuming a normal concentration of volatile components in the thermoplastic being extruded, it is considered that the minimum mandrel opening can be defined as one whose mean cross-sectional area is not less than about 25% of the maximum cross-sectional area of the tube in the region of the mandrel, and whose minimum cross-sectional area is not less than about 10% of the maximum cross-sectional area of the tube in the region of the mandrel. These are the threshold values below which it is not felt that satisfactory convection currents can be established. A more preferable opening size would be one whose mean cross-sectional area and minimum cross-sectional area are not less than about 40% and 20%, respectively, of the maximum cross-sectional area of the tubing in the region of the mandrel.

The lower helicoid 32 of the mandrel 20 is convexly tapered in order to permit the tubing 11 to approach the mandrel gradually. Ideally, the maximum rate of cooling should commence when the tubing reaches the shoulder 33. Upon cooling, thermal shrinkage will automatically tend to take place, and it is for this reason that the upper helicoid 31 is slightly tapered. The tendency for the cooled tubing to shrink inwardly about the upper helicoid 31 will be stronger with thick-walled tubing than with thin-walled tubing, not because of any difference in the coefficient of thermal expansion, but because thin-walled tubing is less capable than thick-walled tubing of pinching off the very thin lamina of air which remains between the mandrel surface and the tubing wall. In FIGURE 2, the distances separating the tubing and the mandrel 20 have been exaggerated for purposes of illustration.

A circular air knife 44, of known design, surrounds the tubing 11 at the location of the mandrel 20 in order to control the tubing 11 as it passes the mandrel 20. The air knife is located approximately at the shoulder 33 of the mandrel 20, and directs air against the exterior walls of the tubing 11. If the tubing 11 has a tendency to swell outwardly beyond the diameter of the mandrel 20, due to a greater than normal pressure in the air bubble, the air knife 44 will tend to counter this tendency by urging the tubing back in toward the mandrel 20. The air knife 44 can also be used to assist in the cooling of the tubing 11, but this is not essential.

Aside from the above functions of the air knife, it has been found that, or reasons that are not yet fully understood, the presence of an air knife is helpful in promoting smooth and trough-free passage of the tubing 11 around the mandrel 20, particularly for tubing having very thin walls. For thicker tubing walls, the contribution of the air knife to smooth flow seems to be less important. It is possible, for example, to produce 20 mil film without the use of an air knife. This being the case, it is not felt that the air knife 44 is an essential component of the inventive combination herein described for all film thicknesses.

During start-up, or "thread-up" as it is known in the trade, the tubing 11, which has a tendency to collapse inwardly upon itself, must be supported against this tendency until the tubing is threaded all the way up past the rollers 41 and through the nip of the rollers 40, at which time the full air bubble can be established.

In FIG. 2 are shown the louvers or dampers 45 which are used to completely seal off the open core of the mandrel 20 during thread-up.

The dampers 45 can be of any suitable construction which will ensure a reasonably air-tight sealing of the hollow core of the mandrel. In this embodiment, the dampers are of the "venetian-blind" type, being a plurality of blades 46 mounted to swivel about stationary shafts 47 with which they are longitudinally aligned. Each blade 46 has a rigid, perpendicular rod 48 fixed to one edge thereof. The rods 48 are aligned and their ends remote from the blades 46 are connected to a swing-bar 49 which opens the blades when it moves to the right (in FIG. 2) and closes the blades when it moves to the left.

Each blade 46 has a resilient sealing strip 50 along the underside of the upper (right-hand) edge, in order to ensure that a reasonably air-tight seal will be obtained between the blades.

The agency which adjusts the position of the swing-bar 49, and thus which opens and closes the blades 45, is a small hydraulic cylinder 51 attached at one end to the rod 28 and at the other to the swing-bar 49. Operating fluid is delivered to and removed from the cylinder 51 by conduits 52, which pass downwardly through the mandrel 20 and through the center of the die 23 to a suitable source of pressurized fluid.

The thread-up procedure is as follows: First the dampers 45 are completely closed. Then, as the extruded tubing 11 is drawn up around the mandrel 20, air is introduced through the tube 43 into the upstream compartment between the mandrel 20 and the die 23. This keeps the tubing 11 from "sticking" to the mandrel surface while the thread-up procedure is going on. As the tubing 11 is taken up beyond the mandrel and introduced between the rollers 41 and the rollers 40, the dampers 45 are gradually opened so that air from the upstream compartment 21 will leak across to the downstream compartment 22 to support the walls in the latter compartment. Meanwhile, air is all the time being slowly introduced through the tube 43. Finally, when thread-up has been completed, the dampers 45 are opened all the way, and the amount of air within the air bubble 15 is adjusted by adding or subtracting air through the pipe 43.

Because of the particular characteristics of the convection currents within the air bubble, it is believed that the best orientation for the device according to the invention is one wherein the tubing is extruded vertically upwardly, and wherein the rollers 40, the mandrel 20 and the die 23 are situated in a vertical column. It would not destroy the usefulness of the invention, however, for the extrusion to take place at some angle to the vertical, and it is believed that the only essential condition is that the downstream compartment be in a higher horizontal plane than the upstream compartment. In the appended claims, the terms "generally upward direction" and "extruding generally upwardly" are intended to connote an orientation in which the downstream compartment is located in a higher horizontal plane than the upstream compartment.

It is to be understood that, where the appended claims recite "thermoplastic material," this term is intended to include all thermoplastic materials that (a) lend themselves to the extrusion process described, and (b) are not dangerous or explosive when undergoing the above process. Thus the term includes such thermoplastics as polyethylene, polypropylene, polyvinyl chloride, cellulose acetate, ethyl cellulose, methyl methacrylate, polymer, nylon, polystyrene, polyvinyl formal-acetate butyral, and vinylidene chloride. It does not include materials such as nitrocellulose, which can be explosive when extruded according to the above process.

What I claim is:

1. In a method of producing flattened tubing comprising the steps of: continuously extruding upwardly a seamless tube of thermoplastic material in the heated, plastic state; continuously drawing the tubing over and beyond a cooled shaping means having a gas impervious and roughened surface and having a circumference substantially corresponding to the desired final circumference of the tubing, contacting the thermoplastic material with the roughened surface and thereby freezing said tubing at the desired circumferential size, externally cooling the tube in the region of the shaping means, drawing the tubing upward and collapsing it at a point beyond the shaping means while maintaining an isolated gaseous bubble in said tubing between the point of extrusion and the point of collapsing, said bubble having a portion downstream of the shaping means, the improvement comprising a passage through said shaping means, said passage having a mean cross-sectional area of not less than about 25% of the maximum cross-sectional area of the tube in the region of the shaping means, and a minimum cross-sectional area of not less than about 10% of the maximum cross-sectional area of the tube in the region of the shaping means whereby volatile substances boiling off the interior of the gaseous bubble upstream of said shaping means can be passed through the said passage to the interior of said gaseous bubble downstream of said shaping means.

2. A method as claimed in claim 1 wherein said passage through the shaping means has a mean cross-sectional area of not less than about 40% of the maximum cross-sectional area of the tube in the region of the shaping means, and has a minimum cross-sectional area of not less than about 20% of the maximum cross-sectional area of the tube in the region of the shaping means.

3. A method as claimed in claim 1 wherein the thermoplastic material is one selected from the group consisting of polyethylene, polypropylene, polyvinyl chloride, cellulose acetate, ethyl cellulose, methyl methacrylate polymer, nylon, polystyrene, polyvinyl formal acetate butyral and vinylidene chloride.

4. A method as claimed in claim 2 wherein the thermoplastic material is one selected from the group consisting of polyethylene, polypropylene, polyvinyl chloride and nylon.

References Cited

UNITED STATES PATENTS

| | | | |
|---|---|---|---|
| 2,987,767 | 6/1961 | Berry et al. | 264—95 |
| 3,329,999 | 7/1967 | Cook | 264—95 |
| 3,335,208 | 8/1967 | Harris | 264—95 |

ROBERT F. WHITE, Primary Examiner

R. SHEAR, Assistant Examiner

U.S. Cl. X.R.

18—14; 264—209